United States Patent [19]

Brodrecht

[11] Patent Number: 4,945,715
[45] Date of Patent: Aug. 7, 1990

[54] BALE BAGGING APPARATUS

[76] Inventor: Gerald Brodrecht, R.R. #1, Thorsby, Alberta, Canada, T0C 2P0

[21] Appl. No.: 289,687

[22] Filed: Dec. 27, 1988

[30] Foreign Application Priority Data

Nov. 2, 1988 [CA] Canada .................. 582,030

[51] Int. Cl.⁵ ............................................. B65B 43/42
[52] U.S. Cl. ........................................ 53/567; 53/576; 53/261
[58] Field of Search ............... 53/567, 576, 261, 262; 414/24.5, 111

[56] References Cited

U.S. PATENT DOCUMENTS

| | | |
|---|---|---|
| 2,982,068 | 5/1961 | Pape et al. . |
| 3,557,526 | 1/1971 | Hartmann . |
| 3,662,514 | 5/1972 | Goss . |
| 3,687,061 | 8/1972 | Eggenmuller ............. 53/576 X |
| 4,042,140 | 8/1977 | McFarland ............. 414/551 X |
| 4,133,164 | 1/1979 | Mintz ..................... 53/576 X |
| 4,204,790 | 5/1980 | Baxter ................... 414/24.5 |
| 4,594,836 | 6/1986 | Good . |
| 4,606,176 | 8/1986 | Cundall .................. 53/576 X |
| 4,672,794 | 6/1987 | Good ..................... 53/576 X |
| 4,686,817 | 8/1987 | Brodrecht . |

FOREIGN PATENT DOCUMENTS

| | | | |
|---|---|---|---|
| 2151116 | 8/1978 | Fed. Rep. of Germany ........ 53/576 |
| 2135955 | 9/1984 | United Kingdom ................ 53/576 |
| 2136761 | 9/1984 | United Kingdom . |

Primary Examiner—John Sipos
Attorney, Agent, or Firm—Murray E. Thrift; Stanley G. Ade; Adrian D. Battison

[57] ABSTRACT

A bale bagging apparatus for bagging round bales in tubes of plastic film includes a hoop and an annular flexible tube support projecting to the rear of the hoop. The tube support conforms to the shape and size of the bales being bagged, so that a tubing may be used that is fairly close in size to the size of the bales. This reduces the amount of air inside the bag and the ultimate looseness of the bagging tube on the bale, which affects its wind resistance and allows the bagging of bales in smaller tubes, which significantly reduces the cost of plastic film.

19 Claims, 3 Drawing Sheets

BALE BAGGING APPARATUS

FIELD OF THE INVENTION

The present invention relates to the insertion of round bales of hay or the like into tubes or "bags" of protective material.

BACKGROUND

Various machines have been proposed for packaging or "bagging" rows of round bales of hay or the like in long tubes of plastic film, which are tied off at the ends to provide a sealed bag containing the bales. This packaging of bales in weather sheaths protects the bales, minimizes their oxidation and weathering of the their outer layers, and eliminates unwanted moisture penetration.

With the known bale bagging machines, a tube of plastic film is retained in a shirred state on a rigid cylinder and is drawn off the cylinder onto bales as the bales are passed through the cylinder. With any such machine, the tube must be significantly larger in diameter than the bale, since the tube must be stored on the outside of the rigid cylinder that is itself large enough to pass over the bale. The cylinder itself must be sufficiently large to accommodate the usual deformation of the bale into an oval shape through natural settling.

With bales packed in a relatively loose tube, there is enough air surrounding the bales that noticeable oxidation can take place. In addition, a loose tube will flap in the wind, so that it must be relatively strong to resist wind damage. Consequently, the ability to fit a tube snugly over a round bale will bring with it a number of advantages. For example, with a tight tube, potential oxidation of the feed and wind damage to the tube are significantly reduced. Because the tight tube may be made smaller and of a thinner material due to the lower strength requirements, tube costs are also reduced.

SUMMARY

The present invention is concerned with an apparatus capable of a relatively tight bagging of round bales in protective tubes.

According to the present invention there is provided a bale bagging apparatus comprising:
 a hoop;
 an annular, flexible, collapsible tube support secured at a front end thereof to the hoop; and
 tube support sustaining means for sustaining the tube support behind the hoop in an annular tube supporting configuration with a smaller circumference than the hoop.

In preferred embodiments of the invention, the bagging apparatus is mounted on a travelling frame, towed from the side. The frame can be drawn up to the end of a row of bales, to draw the hoop and tube support over the bales while simultaneously feeding the bagging tube off the tube support.

The hoop acts to draw the flexible, collapsible tube support and with it a tube supported thereon, over a row of bales. The tube support conforms itself to the size and shape of the bales so that there is no clearance required between the tube support and the bales. This allows the tube to be significantly smaller than the hoop and much closer in size to that of the bale. In preferred embodiments, a single apparatus is capable of bagging a wide range of bale sizes with a corresponding range of tube sizes.

BRIEF DESCRIPTION OF THE DRAWINGS

In the accompanying drawings, which illustrate an exemplary embodiment of the present invention.

DETAILED DESCRIPTION

Figure 1:
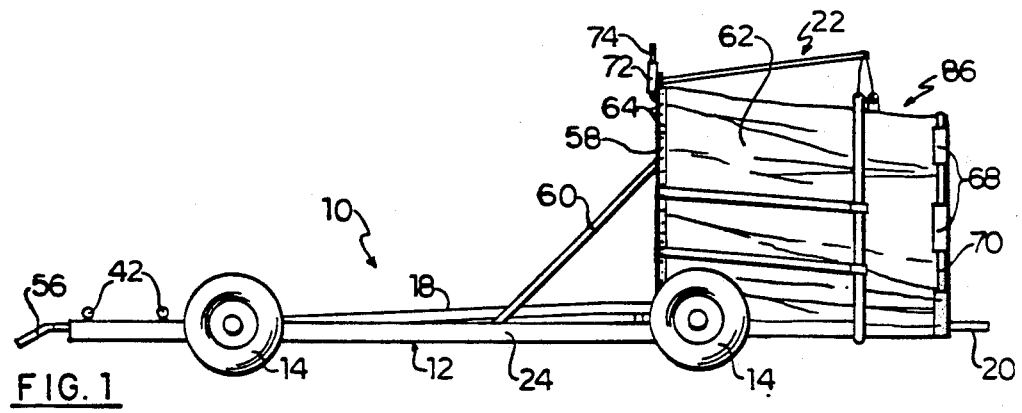
FIG. 1 is a side elevation of a bale bagging apparatus.

Referring to the accompanying drawings, and especially to FIGS. and 2, there is illustrated a bale bagging apparatus 10 with a frame 12 supported on four wheels 14. The apparatus is towed by a draw bar connected to one side of the frame. Two bale lifting bars 18 with forwardly divergent leading ends extend along the centre of the frame and slope upwards towards a flat plate 20 that extends through a bagging section 22 of the apparatus.

Figure 5:
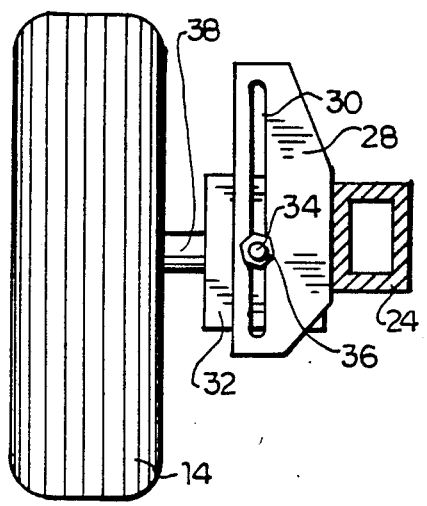
FIG. 5 is an end view of an adjustable wheel support.
Figure 6:
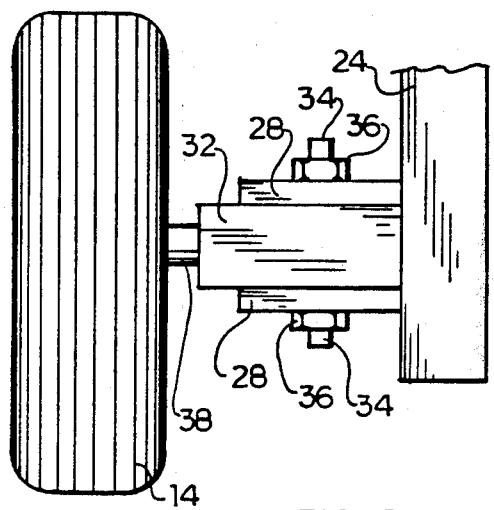
FIG. 6 is a plan view of the wheel support of FIG. 5.

The frame of the bale bagger includes a pair of spaced side rails 24. Each rail carries two of the wheels 14 on respective adjustable wheel supports 26, that ar illustrated most particularly in FIGS. 5 and 6.

Each of the wheel supports 26 includes a pair of spaced plates 28 welded to the side rail 24 of the frame 12. The plates project at right angles from the outer side of the rail. Each of the plates has an elongated, vertical slot 30 through it, as illustrated most particularly in FIG. 5. A support block 32 slides between the two plates, in engagement with the outer side face of the rail 24. A stud 34 projects from one side of the support block 32 through the slot 30 in the adjacent plate 28, while two similar studs 34 project from the opposite side through the slot 30 of the other plate 28. Nuts 36 fitted on the studs 34 secure the support block to the plates 28. An axle 38 projects from the outside of the support block 32 and carries a wheel 14.

By loosening the nuts 36, the height of the frame 12 can be adjusted on the wheels 14 between an elevated transport position and a lowered operating position with the rails 24 very close to the ground.

Figure 2:
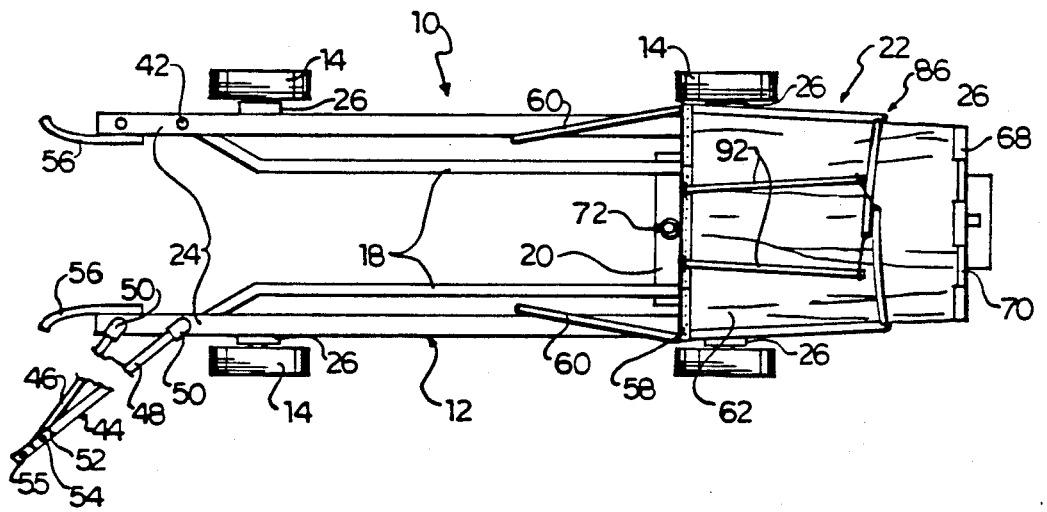
FIG. 2 is a plan view of the apparatus of FIG. 1.
Figure 3:
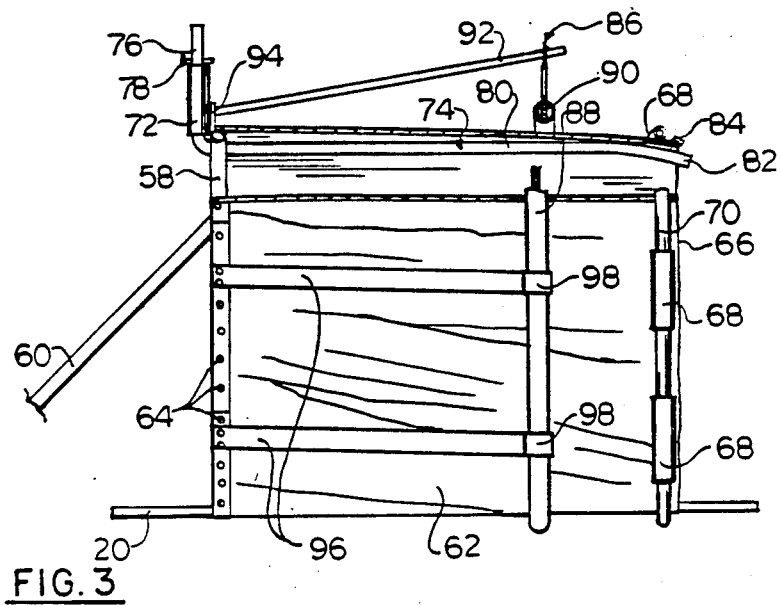
FIG. 3 is a side elevation, partially broken away, of the tube suport and related structure.
Figure 4:
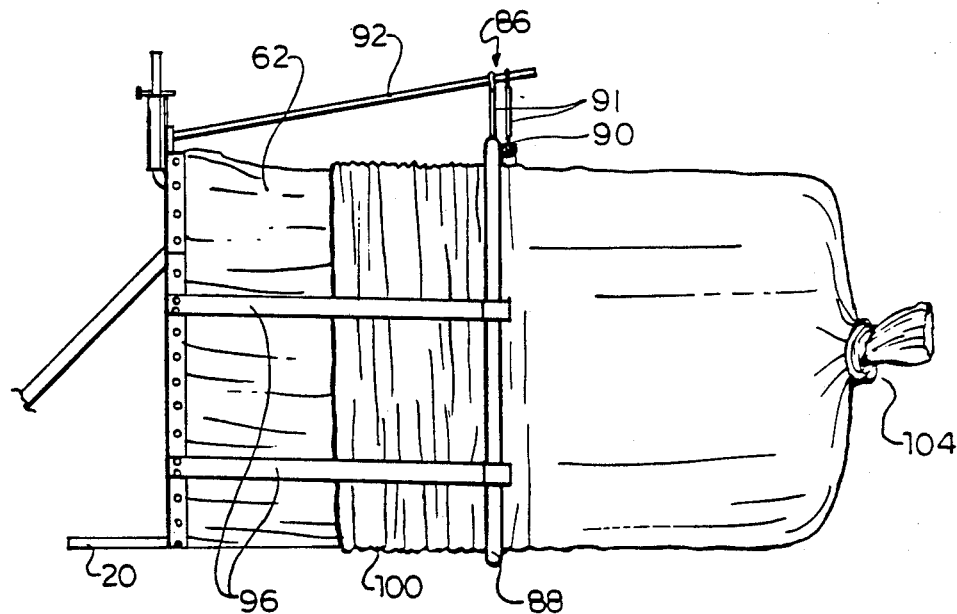
FIG. 4 is a view like FIG. 3 illustrating the apparatus in use.

As illustrated in FIGS. 1 and 2, each side of the frame 12 is equipped with two hitch balls 42 spaced along the associated side rail 24. These are used in association with a draw bar 44 that includes a short beam 46 with a hitch 50 connected to the forward ball 42 and a longer beam 48 with a hitch 50 connected to the rearward ball 42. The longer beam 48 is equipped with a yoke 52 at the end opposite the hitch 50. The yoke is pinned to the leading end of the shorter beam 46 with a vertical pin 54. The draw bar can thus be disconnected from one side of the frame by disconnecting the hitches 50 and moved over to the opposite side of the frame and connected simply by swinging the short beam 46 around the pin 54 to the opposite side of the long beam 48. The yoke 52 may be pin connected to the hitch of a towing vehicle, using holes 55.

At the forward end of the frame 12, each of the side rails 24 carries a forwardly and outwardly projecting guide bar 56 that serves to engage the side of a bale being approached off-centre by the frame and to centre the frame on the bale.

Towards the rear end of the frame 12, is the bagging section 22. This includes a large octagonal hoop 58 extending across the frame ahead of the rear wheels 14. The hoop is braced against the side rails 24 by angled struts 60. Connected to the hoop 58 is a flexible tube support 62 which is a plastic tarpaulin formed into a short tube. The front end of the tube support is connected to the hoop 58 by a series of screws 64. At the back end of the tube support 62 is a series of sleeves 68 that carry a circumferential hoop 70 formed from a length of resilient tubing. The hoop serves to sustain the rear end of the tube support 62 in a roughly circular shape with a size smaller than that of the hoop 58. The ends of the hoop 70 are connected by a short length of smaller diameter tube fitted into the two ends.

A vertical sleeve 72 is secured to the front of the hoop 58 at the top. This carries a support bracket 74 with a vertical leg 76 that projects through the sleeve 72. A bolt 78 through the leg 76 rests on the top of the sleeve 72 to retain the leg in the sleeve. The other leg of the support bracket projects to the rear, through the tube support 62. At the back end 66 of the tube support the leg 80 curves downwardly at 82 and is secured to the tube support by a screw 84. This support bracket is used to vary the size of the outlet end of the tube support. It is not necessary in all applications, but is particularly useful where an apparatus designed to handle relatively large bales is to be used for bagging bales of much smaller size. In that case, the bracket is adjusted to a lower position and the hoop 70 is replaced with a smaller hoop so that the outlet end of the tube support 62 is comparable in size to the size of the small bale. The loose connection of the leg 76 in the sleeve 72 allows the bracket to move from side to side to accommodate differences in bale alignment.

Forwardly from the support sustaining hoop 70 is a bagging tube retainer 86. This includes a ring of tubing 88 wrapped around the tube support 62. A cord 90 runs through the tubing 88 and has its opposite ends connected to respective ones of elastic tarp straps 91, which are in turn hooked onto two rods 92. The rods 92 are mounted on the hoop 58 by brackets 94 and project to the rear, above the tube support 62. Several ties 96 are secured to the hoop 58 and project to the rear, where they have sleeves 98 formed at their ends. The tubing 88 of the bagging tube retainer 86 fits through the sleeves 96.

To use the apparatus, a shirred tube 100 of plastic film is installed on the tube support 62, with the bulk of the tube 100 ahead of the tube retainer tubing 88. In actual practice, the tube 100 is fitted on the tube support and then the tube retainer is wrapped around it. The rear end of the tube 100 is extends out from under the tubing 88, over the hoop 70 and is tied off with a knot 104. The apparatus is then driven onto the end of a row of round bales, so that the bales are progressively lifted by the bars 18 onto the plate 20, through the hoop 58 and the tube support 62. Because the tube support 62 is flexible, it will conform to the shape of the bale as it is expressed through the rear end of the tube support. This means that the tube 100 supported by the tube support 62 can be very close in size to the size of the bales being bagged. As a bale is expressed from the rear end of the tube support 62, it engages the knotted end of the tube 100 and draws the tube off the end of the tube support 62, under the tubing 88 of the tube retainer 86. The retainer 86 maintains a tension on the tube 100 to the rear while maintaining the bulk of the tube 100 in a shirred state forwardly of the tube retainer on the support 62. The tethers 96 and the rods 92 serve to maintain the tube retainer in the proper location.

It is often necessary to retain the final bale or few bales in a row against movement as they are being picked up for bagging. This can be done using any appropriate anchoring mechanism, for example that illustrated in U.S. Pat. No. 4,686,817.

Figure 7:
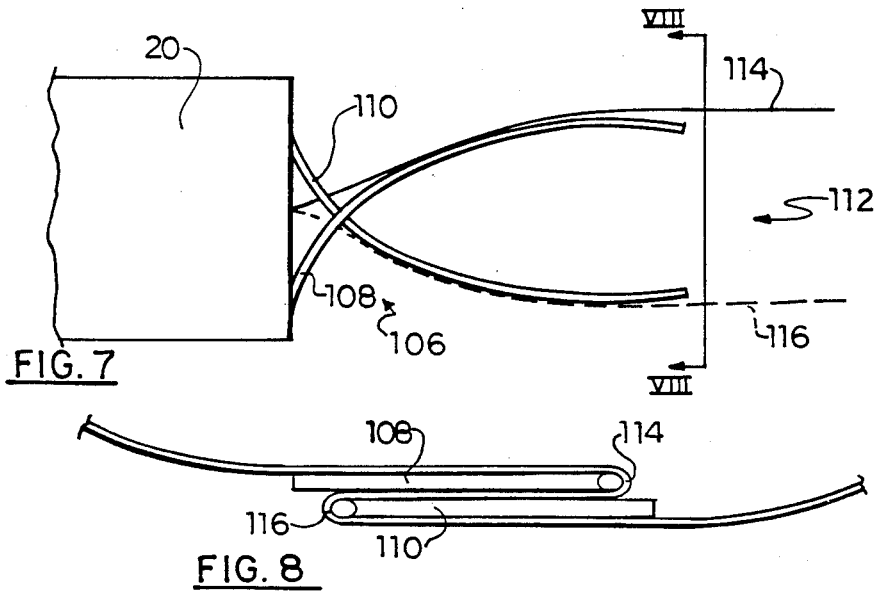
FIG. 7 is a plan view of a pleating device.
Figure 8:
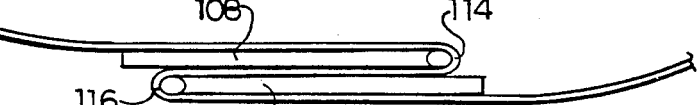
FIG. 8 is an end elevation of the pleating device of FIG. 7 in use.

An optional feature that may be included to further tighten a bagging tube on the bales is the pleating mechanism illustrated in FIGS. 7 and 8. This pleater 106 includes a pair of vertically offset spring fingers 108 and 110 projecting from the rear of the bale support plate 20 and sloping to opposite sides of the bagger. The two fingers engage the under side of the tube 100 where it passes off the tube support 62 and form it into a pleat 112 with two folds 114 and 116. This provides a final tightening of the tube 100 on the bale, further improving the wind resistance of the tubing and reducing the amount of included air. The pleat is located immediately beneath the bale and is kept in its folded state by the considerable weight of the bale.

While one embodiment of the present invention has been described in the foregoing, it is to be understood that other embodiments are possible within the scope of the present invention. The invention is to be considered limited only by the scope of the appended claims.

I claim:

1. A bale bagging apparatus comprising:
   a hoop of fixed size and configuration;
   a tube support comprising an annular, pliant, contractable sleeve with an inlet end and an outlet end, the tube support being secured at the inlet and thereof to the hoop; and
   sustaining means for sustaining the outlet end of the tube support in an annular configuration with a smaller circumference than the hoop.

2. An apparatus according to claim 1 including tube retaining means for retaining a shirred plastic tube on the tube support, and allowing the tube to be drawn unshirred from the outlet end of the tube support.

3. An apparatus according to claim 2 wherein the sustaining means comprise a sustaining ring of flexible material secured to the tube support adjacent the outlet end thereof.

4. An apparatus according to claim 3 wherein the sustaining ring comprises a length of resilient tubing.

5. An apparatus according to claim 3 wherein the tube retaining means comprise a resilient retaining ring around the tube support, between the inlet end of the tube support and the sustaining ring.

6. An apparatus according to claim 5 including tension members connected between the retaining ring and the hoop.

7. An apparatus according to claim 6 including retainer support means supporting the retaining ring.

8. An apparatus according to claim 7 wherein the retainer support means include rods projecting from the hoop, above and towards the outlet end of the tube support, and tie means connecting the rods to the retaining ring.

9. An apparatus according to claim 8 wherein the retaining ring comprises a length of flexible tubing and the tie means comprise a cord extending through the tubing.

10. An apparatus according to claim 1 including a frame supporting the hoop.

11. An apparatus according to claim 10 including support wheels on the frame.

12. An apparatus according to claim 11 including means for adjusting the height of the frame on the wheels.

13. An apparatus according to claim 11 including draw bar means for connecting the frame to a towing vehicle positioned to one side of the frame.

14. An apparatus according to claim 13 wherein the draw bar means are removably connectable to either side of the frame.

15. An apparatus according to claim 11, the apparatus having a forward end and a rearward end, with the tube support projecting rearwardly from the hoop, and further including bale lifting means extending forwardly from the hoop for engagement under a bale and for lifting the bale into the hoop in response to forward movement of the frame relative to the bale.

16. An apparatus according to claim 15 including a bale support plate carried by the frame and extending through the hoop and the tube support, at the bottom thereof.

17. An apparatus according to claim 1 including pleating means for forming a pleat in a tube as it is drawn from the tube support means.

18. An apparatus according to claim 1 wherein the tube support comprises a flaccid material.

19. In a bale bagging apparatus of the type having an annular tube support comprising a sleeve with an inlet end and an outlet end, the tube support being sized to pass a bale to be bagged therethrough from the inlet end to the outlet end, and means for releaseably retaining a bagging tube on the sleeve so that the tube may be withdrawn progressively from the outlet end of the tube support onto a bale passing through the tube support, the improvement wherein:

the tube support is pliant and contractable in use so as to conform with the shape and size of a bale passing therethrough, and the apparatus comprises means for maintaining the inlet end of the tube support in a predetermined annular configuration and size large than the size of the outlet end.

* * * * *